US010576957B2

(12) United States Patent
Yen et al.

(10) Patent No.: US 10,576,957 B2
(45) Date of Patent: Mar. 3, 2020

(54) BRAKE FLUID LIFE MONITORING

(71) Applicant: GM GLOBAL TECHNOLOGY OPERATIONS LLC, Detroit, MI (US)

(72) Inventors: Chih-hung Yen, Bloomfield Hills, MI (US); Richard A. Kaatz, Milford, MI (US); Steven J. Weber, Mount Clemens, MI (US); John M. Moote, Plymouth, MI (US); Patrick M. Hanley, Bloomfield Hills, MI (US); Xiaoyu Huang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 352 days.

(21) Appl. No.: 15/497,301

(22) Filed: Apr. 26, 2017

(65) Prior Publication Data

US 2018/0312154 A1 Nov. 1, 2018

(51) Int. Cl.
*B60T 17/22* (2006.01)
*B60T 13/66* (2006.01)
*F16D 66/00* (2006.01)
*G07C 5/08* (2006.01)

(52) U.S. Cl.
CPC .......... *B60T 17/221* (2013.01); *B60T 13/662* (2013.01); *B60T 17/225* (2013.01); *F16D 66/00* (2013.01); *B60T 2210/30* (2013.01); *F16D 2066/001* (2013.01)

(58) Field of Classification Search
CPC ............... B60T 17/221; B60T 2210/30; B60T 2260/00; B60T 17/225; B60T 13/662; B60T 17/227; F16D 2066/001; F16D 66/00

See application file for complete search history.

(56) References Cited

U.S. PATENT DOCUMENTS

| 8,643,483 B2* | 2/2014 | Oh ...................... B60R 16/0234 340/438 |
| 2015/0228129 A1* | 8/2015 | Cox ...................... G07C 5/0808 701/29.1 |
| 2017/0072932 A1* | 3/2017 | Steward ................. B60T 17/221 |
| 2017/0183599 A1* | 6/2017 | Petty ....................... B60T 17/18 |

* cited by examiner

*Primary Examiner* — Hunter B Lonsberry
*Assistant Examiner* — Mathew Franklin Gordon
(74) *Attorney, Agent, or Firm* — Quinn IP Law

(57) ABSTRACT

According to aspects of the present disclosure, a vehicle includes a braking system, at least one controller, and at least one memory. The braking system includes a brake fluid therein and a brake pedal. The at least one memory stores instructions that, when executed by the at least one controller, are configured to: determine, via a boiling-point module, a boiling point of a brake fluid within a braking system of a vehicle; determine, via a fluidic-properties module, fluidic properties of the brake fluid; determine, via a corrosion-inhibitor module, an amount of corrosion inhibitors within the brake fluid; determine, via a reserve-alkalinity module, a reserve alkalinity of the brake fluid; estimate, a brake-fluid life module, a remaining effective life of the brake fluid using the boiling point, the fluidic properties, the amount of corrosion inhibitors, and the reserve alkalinity; and adjust a response curve of the braking system.

20 Claims, 3 Drawing Sheets

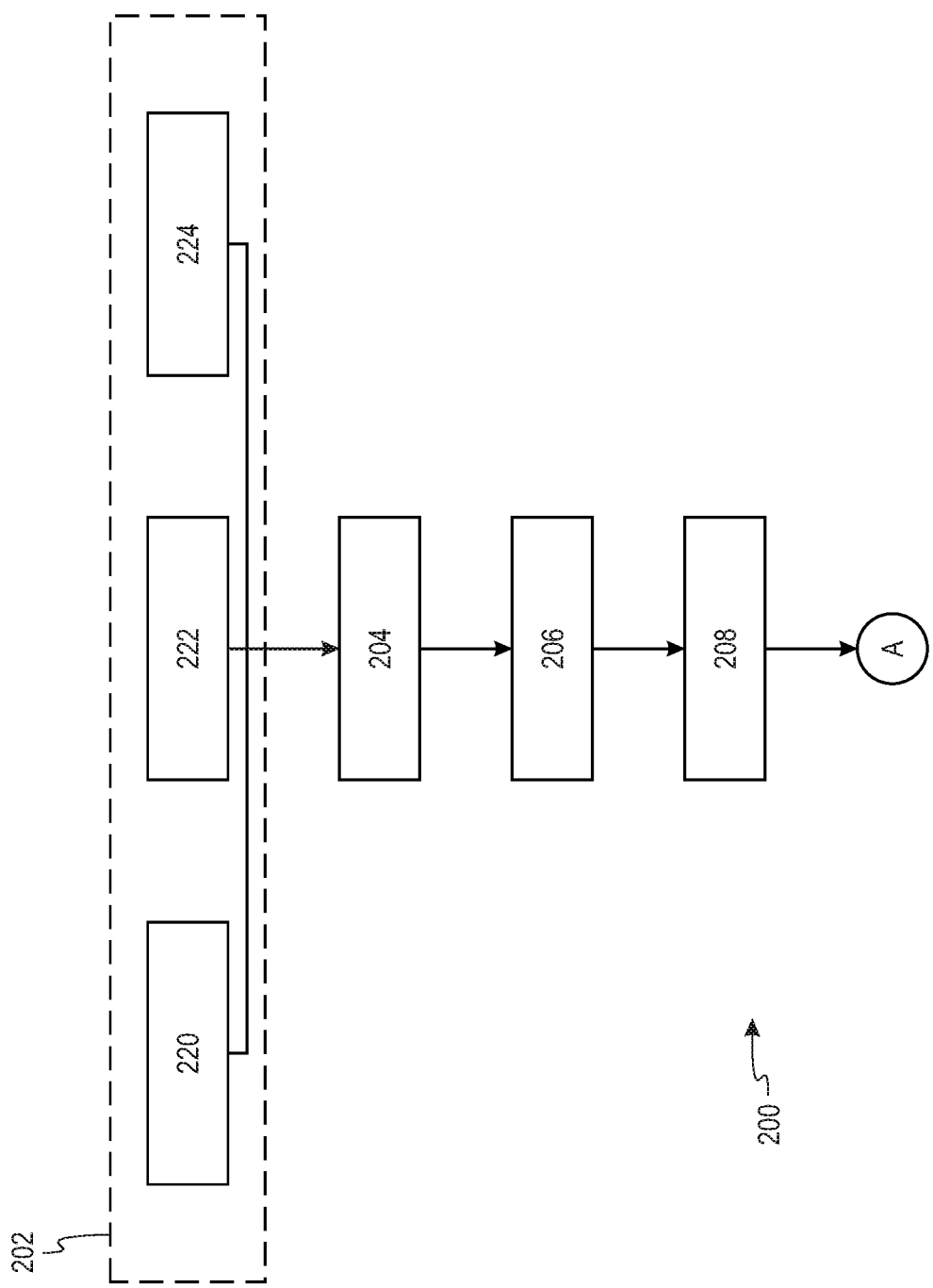

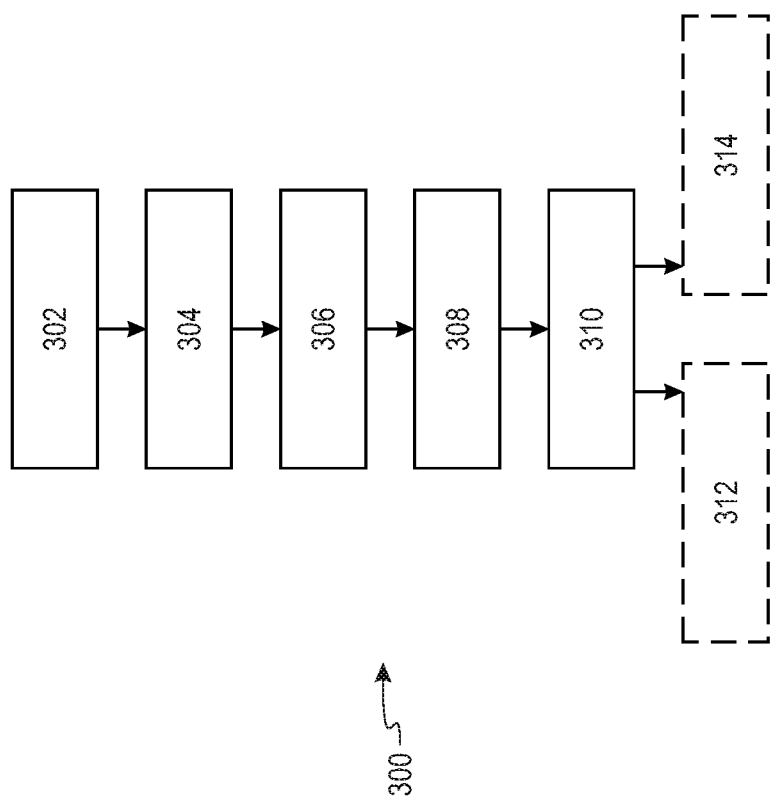

BRAKE FLUID LIFE MONITORING

INTRODUCTION

The disclosure relates to the field of hydraulic braking and, more specifically, to systems and methods for monitoring and estimating the life of brake fluid.

Hydraulic braking systems use brake fluid to transfer pressure to a braking mechanism such as a brake caliper and rotor. The braking system includes a brake pedal, a pushrod, a master cylinder assembly, and the braking mechanism. In response to actuation of the brake pedal, the pushrod forces brake fluid from the master cylinder assembly to the braking mechanism and pressurizes the fluid to apply a braking torque to, for example, the rotor.

Performance of the braking system is affected by the brake fluid. Degraded brake fluid can negatively affect the hydraulic braking system by promoting corrosion, reducing brake performance, increasing brake pedal travel, and slowing response of the brake system.

Brake fluids are assigned designations under, for example, the Department of Transportation minimal specifications. Each designation includes a recommended replacement interval based on standardized testing. For example DOT 4 brake fluid recommends replacement every 2 years. What is more, the replacement intervals can be changed and updated without notice to service provider or vehicle owners. For example, DOT 3 fluid had no service interval prior to 2012, a three-year service interval from 2012-2015, and a five-year service interval from 2015-present.

SUMMARY

It is desirable to provide systems and methods of monitoring brake fluid life and health for individual systems to optimize braking performance. Beneficially, systems and methods in accord with the present disclosure optimize braking performance by adapting to individualized usage and accounting for service factors, environmental factors, and usage factors.

According to aspects of the present disclosure, a vehicle includes a braking system, at least one controller, and at least one memory. The braking system includes a brake fluid therein and a brake pedal. The at least one memory stores instructions that, when executed by the at least one controller, are configured to: determine, via a boiling-point module, a boiling point of a brake fluid within a braking system of a vehicle; determine, via a fluidic-properties module, fluidic properties of the brake fluid; determine, via a corrosion-inhibitor module, an amount of corrosion inhibitors within the brake fluid; determine, via a reserve-alkalinity module, a reserve alkalinity of the brake fluid; estimate, a brake-fluid life module, a remaining effective life of the brake fluid using the boiling point, the fluidic properties, the amount of corrosion inhibitors, and the reserve alkalinity; and adjust, via a braking-control module, a response curve of the braking system such that a predetermined braking input provides a predetermined braking torque at the remaining effective life substantially equal to the braking torque provided by the predetermined braking input at an initial life of the brake fluid.

According to further aspects of the present disclosure, the boiling point of the brake fluid is determined using the environment of the vehicle and a time in service of the brake fluid.

According to further aspects of the present disclosure, the fluidic properties of the brake fluid are determined using the environment of the vehicle, a time in service of the brake fluid, and a usage of the brake fluid within the braking system.

According to further aspects of the present disclosure, the amount of corrosion inhibitors within the brake fluid is determined using a time in service of the brake fluid.

According to further aspects of the present disclosure, the reserve alkalinity of the brake fluid is determined using a time in service of the braking fluid and a usage of the brake fluid within the braking system.

According to further aspects of the present disclosure, the instructions are further configured to determine, via a rotor temperature module, a temperature of each brake rotor exposed to the brake fluid, and the usage of the brake fluid includes use of the temperature.

According to further aspects of the present disclosure, the vehicle further includes a plurality of sensors configured to collect environmental data of an environment of the vehicle, and the environmental data includes an ambient temperature.

According to further aspects of the present disclosure, the environmental data includes a humidity.

According to further aspects of the present disclosure, the instructions are further configured to display, via a user interface, the remaining effective life and instruct, via an alert system of the vehicle, a user to replace the brake fluid in response to the remaining effective life falling below a predetermined threshold.

According to aspects of the present disclosure, a method includes determining, via at least one controller, a boiling point of a brake fluid within a braking system of a vehicle; determining, via the at least one controller, fluidic properties of the brake fluid; determining, via the at least one controller, an amount of corrosion inhibitors within the brake fluid; determining, via the at least one controller, a reserve alkalinity of the brake fluid; estimating, via the at least one controller, a remaining effective life of the brake fluid using the boiling point, the fluidic properties, the amount of corrosion inhibitors, and the reserve alkalinity; and instructing, via an alert system of the vehicle, a user to replace the brake fluid in response to the remaining effective life falling below a predetermined threshold.

According to further aspects of the present disclosure, the boiling point of the brake fluid is determined using an environment of the vehicle and a time in service of the brake fluid.

According to further aspects of the present disclosure, the fluidic properties of the brake fluid are determined using an environment of the vehicle, a time in service of the brake fluid, and a usage of the brake fluid within the braking system.

According to further aspects of the present disclosure, the amount of corrosion inhibitors within the brake fluid is determined using a time in service of the brake fluid.

According to further aspects of the present disclosure, the reserve alkalinity of the brake fluid is determined using a time in service of the braking fluid and a usage of the brake fluid within the braking system.

According to further aspects of the present disclosure, the remaining effective life falling below a predetermined threshold is triggered in response to the reserve alkalinity falling below a predetermined level.

According to further aspects of the present disclosure, the remaining effective life falling below a predetermined threshold is triggered in response to the amount of corrosion inhibitors falling below a predetermined level.

According to aspects of the present disclosure, a method includes: determining, via at least one controller, a boiling point of a brake fluid within a braking system of a vehicle based on an environment of the vehicle and a time in service of the brake fluid; determining, via the at least one controller, fluidic properties of the brake fluid based on the environment of the vehicle, the time in service of the brake fluid, and a usage of the brake fluid within the braking system; determining, via the at least one controller, an amount of corrosion inhibitors within the brake fluid based on the time in service of the brake fluid; determining, via the at least one controller, a reserve alkalinity of the brake fluid based on a time in service of the braking fluid and a usage of the brake fluid within the braking system; estimating, via the at least one controller, an effective life of the brake fluid using the boiling point, the fluidic properties, the amount of corrosion inhibitors, and the reserve alkalinity; and adjusting, via a braking-control module, a response curve of the braking system such that a predetermined travel of a brake pedal provides a predetermined braking torque at the effective life substantially equal to the braking torque provided by the predetermined braking input at an initial life of the brake fluid.

According to further aspects of the present disclosure, the boiling point of the brake fluid is determined using an environment of the vehicle and a time in service of the brake fluid.

According to further aspects of the present disclosure, the fluidic properties of the brake fluid are determined using an environment of the vehicle, a time in service of the brake fluid, and a usage of the brake fluid within the braking system.

According to further aspects of the present disclosure, the amount of corrosion inhibitors within the brake fluid is determined using a time in service of the brake fluid, and the reserve alkalinity of the brake fluid is determined using a time in service of the braking fluid and a usage of the brake fluid within the braking system.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

FIG. 2 is a schematic illustration of view of usage inputs to the usage module of FIG. 1;

FIG. 3 is a flowchart of a method of monitoring brake-fluid life, according to aspects of the present disclosure.

DETAILED DESCRIPTION

Figure 1:
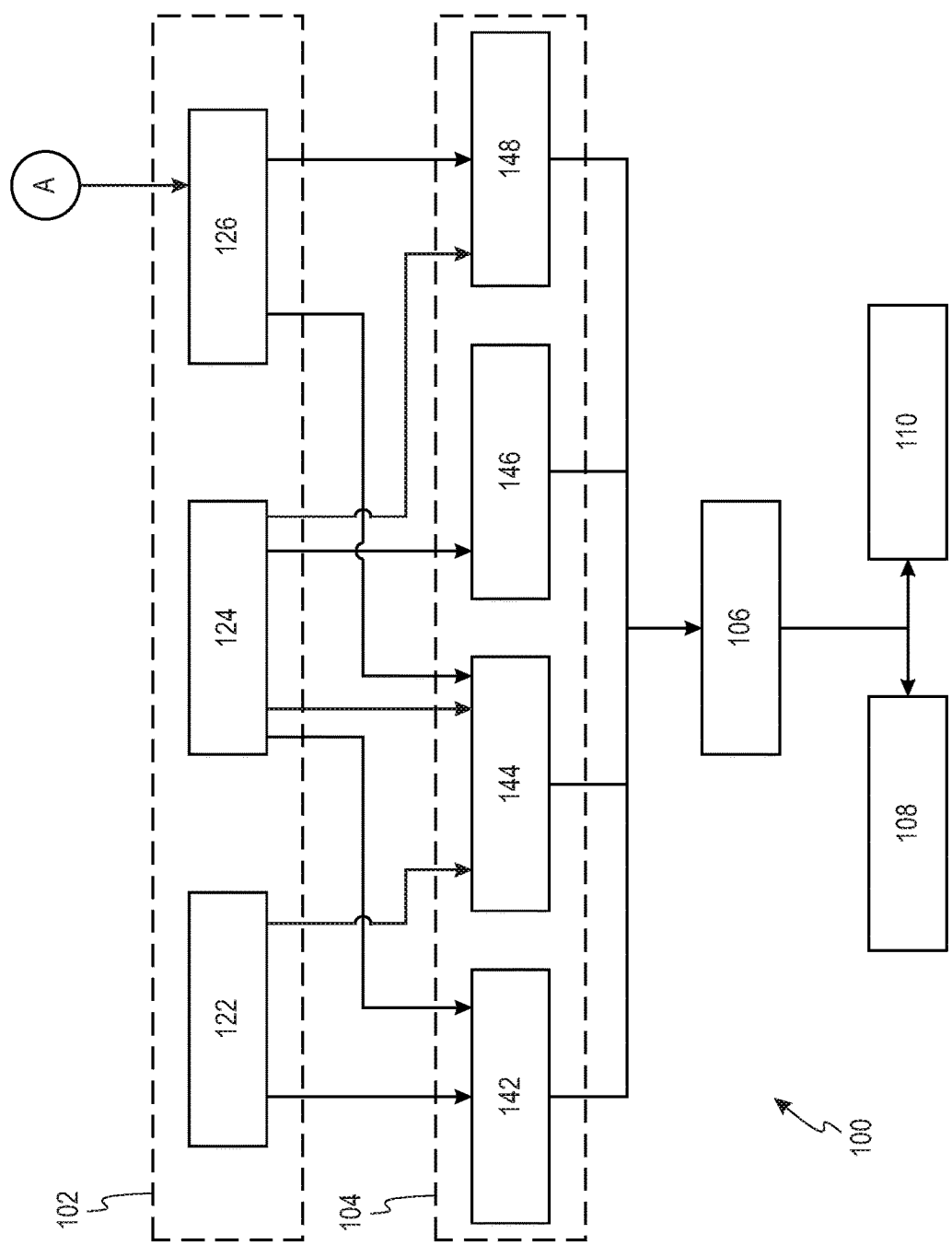
FIG. 1 is a schematic illustration of a brake-fluid life monitoring system, according to aspects of the present disclosure.

Systems and methods in accordance with the present disclosure are described in the context of a braking system for a vehicle. The vehicle includes hydraulically-activated brakes at each of four wheels. The hydraulically-activated brakes can be any known type such as disc brakes or drum brakes. A driver-manipulated brake pedal is mechanically coupled to a master cylinder for producing hydraulic pressure in proportion to the force applied to brake pedal. The master cylinder, which may include a pneumatic or motor-driven booster, proportions the hydraulic pressure between front and rear brake supply lines a conventional manner. In anti-lock braking systems, the supply lines are coupled to antilock modulators which modulate the braking torque applied. The master cylinder can also be actuated by an automated system such as an object-avoidance system. It is contemplated that additional/alternative components to the master cylinder may be used including, but not limited to, motor-driven boosters, slave cylinders, plungers, combinations thereof, and the like.

The vehicle includes a number of sensors producing data for input into various control and diagnostic units. These sensors can include, for example, wheel speed sensors, pedal position sensors, temperature sensors, environmental sensors, component position sensors, conductivity sensors, moisture sensors, metal content sensors, and the like. Microcontroller-based modules receive the various inputs from and operate in response to these inputs. The outputs of the microcontroller-based modules can be, for example, control signals configured to control operation of a component or processed data configured to be used as inputs by control and diagnostic units. Beneficially, systems and methods in accord with the present disclosure can be implemented on existing equipment without the need for additional or specialized sensors.

The terms "controller," "control module," "control," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The controller may alternatively be configured as a central processing unit (CPU). The controller may include a processor (e.g., a microprocessor) and at least one memory, at least some of which is tangible and non-transitory. The memory can store controller executable instruction sets, and the processor can execute the controller executable instruction sets stored in the memory. The memory may be any recordable medium that participates in providing computer-readable data or process instructions. Such a medium may take many forms, including but not limited to non-volatile media and volatile media. Non-volatile media for the controller may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to the processor. The memory of the controller may also include a floppy disk, a flexible disk, hard disk, magnetic tape, any other magnetic medium, a CD-ROM, DVD, any other optical medium, solid state media, etc. The controller can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller or accessible thereby may be stored in the memory and automatically executed to provide the required functionality for components coupled to the controller.

FIG. 1 is a schematic illustration of a brake-fluid life monitoring system 100. The brake-fluid life monitoring system 100 includes a plurality of data collection modules 102, a plurality of analysis modules 104, a brake-fluid life module 106, an alert module 108, and a braking-control module 110. The data collection modules 102 include, for example, an environmental module 122, a time-in-service module 124, and a usage module 126.

The environmental module 122 is configured to collect and output data related to environmental conditions to which the vehicle is exposed. The environmental conditions can include, for example, temperature, humidity, precipitation, and the like. The environmental conditions can be collected by sensors within the vehicle and/or external repositories. The external repositories can be accessed using the Internet or other data-transfer services.

The time-in-service module 124 is configured to collect and output data related to the time period that the brake fluid has been in service within the vehicle. The beginning of the time period can be initiated manually or automatically. For example, a service technician or a user may select an option presented via a user interface to indicate that the brake fluid has been replaced. Additionally or alternatively, the vehicle may include a sensor to detect when a level of brake fluid has been depleted and refilled as would occur during a flush of the brake fluid.

The usage module 126 is configured to collect and output data related to usage of the braking system. The usage variables can include, for example, braking applications, braking torque, energy dissipated, and heat transferred to the braking fluid.

The analysis modules 104 include, for example, a boiling-point module 142, a fluidic-property module 144, corrosion-inhibitor module 146, and a reserve-alkalinity module 148.

The boiling-point module 142 is configured to provide a current boiling point for the brake fluid based on data received from the environmental module 122 and the time-in-service module 124. The boiling point for the brake fluid can be modeled as a function of the environmental conditions to which the vehicle is exposed and the time period that the brake fluid has been in service within the vehicle. Brake fluids tend to be hygroscopic and the absorbed moisture will affect the boiling point of the brake fluid by generally lowering the boiling point as more water is absorbed into the brake fluid. The boiling-point module 142 uses lookup tables, equations, or both to estimate or calculate the boiling point of the brake fluid at a particular time. In some aspects, lookup tables are used which are determined from laboratory data, field data, calibration data, combinations thereof, and the like. In some aspects, the equation is $$[BP]_t = e^{-\frac{M}{C}} [BP]_0 (1 - D \ast t) \quad (1)$$

where $[BP]_t$ is the boiling point at time t, $[BP]_0$ is the initial boiling point, C and D are model parameters, and M is the water content. The constants C, D can be determined, for example, by fitting data where the remaining parameters are known. The water content M is variable as a function of temperature T, humidity H, and time t.

The fluidic-property module 144 is configured to provide a current set of fluidic properties for the brake fluid. The fluidic properties for the brake fluid can be modeled as a function of the environmental conditions to which the vehicle is exposed, the time period that the brake fluid has been in service within the vehicle, and the usage of the braking system. The fluidic properties modeled can include, for example, viscosity and compressibility. The temperature of the brake fluid and the absorbed moisture affect the fluidic properties of the brake fluid. The fluidic-property module 144 uses lookup tables, equations, or both to estimate or calculate the fluidic properties of the brake fluid at a particular time. In some aspects, lookup tables are used which are determined from laboratory data, field data, calibration data, combinations thereof, and the like. In some aspects, the equation is $$[\mu]_T = Ae^{-BT} \quad (2)$$

where $[\mu]_T$ is the viscosity at given brake fluid temperature T, and where A and B are constants. The constants A, B can be determined, for example, by fitting data where the remaining parameters are known.

The corrosion-inhibitor module 146 is configured to provide a current amount of corrosion inhibitors in the brake fluid. Corrosion inhibitors are provided within the brake fluid to inhibit corrosion of components such as calipers and the master cylinder. The amount of corrosion inhibitors in the brake fluid can be modeled as a function of the time period that the brake fluid has been in service within the vehicle. The corrosion-inhibitor module 146 uses lookup tables, equations, or both to estimate or calculate the amount of corrosion inhibitors in the brake fluid at a particular time. In some aspects, lookup tables are used which are determined from laboratory data, field data, calibration data, combinations thereof, and the like. In some aspects, the equation is $$[A]_t = k_{inhib}[A]_0 t \quad (3)$$

where $[A]_0$ is the initial concentration of corrosion inhibitor, $[A]_t$ is the concentration of corrosion inhibitors at given time t, and $k_{inhib}$ is a rate constant. The rate constant $k_{inhib}$ can be estimated using known rate estimation techniques or may be determined through laboratory testing.

The reserve-alkalinity module 148 is configured to provide a current reserve alkalinity of the brake fluid. The reserve alkalinity is a measure of the basicity of the brake fluid. The brake fluid is an alkaline solution to further inhibit corrosion of the braking system components. The reserve alkalinity of the brake fluid can be modeled as a function of the time period that the brake fluid has been in service within the vehicle and the usage of the braking system. The reserve-alkalinity module 148 uses lookup tables, equations, or both to estimate or calculate the reserve alkalinity of the brake fluid at a particular time. In some aspects, lookup tables are used which are determined from laboratory data, field data, calibration data, combinations thereof, and the like. In some aspects, the Arrhenius equation is used to provide the reserve alkalinity, written as $$[OH^-]_t = Ae^{-\frac{E_a}{RT}}[OH^-]_0 t \quad (4)$$

where $[OH^-]_0$ is the initial concentration of hydroxide, $[OH^-]_t$ is the concentration of hydroxide at time t, A is the pre-exponential factor, $E_a$ is the activation energy, R is the gas constant, and T is the temperature. A and $E_a$ can be determined using accelerated laboratory testing.

The brake-fluid life module 106 is configured to provide a remaining effective life of the brake fluid. The remaining effective life of the brake fluid accounts for braking ability and braking response of the vehicle. The braking ability of the vehicle is proportional to the boiling point of the brake fluid. For example, the braking ability of the vehicle decreases as the boiling point for the brake fluid decreases. The braking response of the vehicle changes in response to a change in the fluidic properties. For example, the master cylinder must have a greater displacement to achieve the same braking torque as the brake fluid becomes more compressible. Also, the master cylinder must have a greater displacement to achieve the same braking torque as the brake fluid becomes more viscous to compensate for head loss through the brake lines.

The alert module 108 is configured to alert a user or service technician in response to the brake-fluid life reaching a predetermined threshold. For example, if the brake-fluid life drops below a predetermined threshold for braking ability of the vehicle, the alert module 108 may alert a user or technician for replacement of the brake fluid. A diagnostic code may be produced and saved on an onboard computer and/or may be transmitted to the original equipment manufacturer, vendor, service technician, and/or third party. An indication may be provided to the user via, for example, a dashboard indication mechanism or a digital message sent via an SMS or email protocol.

The braking-control module 110 is configured to apply a braking torque to slow the vehicle in response to a braking input. In some aspects, the braking input is received via a driver-manipulated brake pedal that is mechanically coupled to a master cylinder for producing hydraulic pressure in proportion to the travel of the brake pedal. That is, as brake-pedal travel increases, displacement of the master cylinder increases proportionally using a response curve. The response can be curve can be linear or nonlinear. In some aspects, the braking-control module 110 is configured to modify a proportion between the brake-pedal travel and the master-cylinder displacement in response to a change in the brake-fluid life. As the remaining brake-fluid life decreases, the braking-control module 110 can increase the response of master-cylinder displacement to brake-pedal travel to account for degradation of brake fluid. That is, the braking-control module 110 can modify the response curve such that a predetermined brake-pedal travel will produce a predetermined braking torque despite degradation of the brake fluid.

In some aspects, the braking input is received via a control signal from a controller of an autonomous vehicle. Similarly here, the braking-control module 110 can modify the response curve such that a predetermined control signal will produce a predetermined braking torque despite degradation of the brake fluid.

Referring now to FIG. 2, usage inputs 200 are shown. The usage inputs include sensors 202, a brake system design module 204, a rotor design module 206, and a rotor temperature module 208. The sensors 202 are configured to collect data associated with the vehicle. The sensors 202 can include, for example, vehicle dynamics sensors 220, environmental conditions sensors 222, and brake input sensors 224.

The brake system design module 204 receives inputs from the available sensors 202 and models properties of the brake system and associated with the sensor inputs such as braking torque applied, duration of application, and the like. The rotor design module 206 receives inputs from the brake system design module 204 and calculates the energy dissipated by each of the brake rotors. The rotor temperature module 208 receives inputs from the rotor design module 206 and calculates the temperature of each brake rotor to which the brake fluid is exposed. The output of the rotor temperature module 208 is provided as inputs to the usage module 126.

Data can be transferred between the models in a variety of suitable forms and a variety of suitable times. Suitable forms can include, for example, raw data, binned data, or correlation coefficients. Suitable times for sending the data can include, for example, in response to receipt of a request, expiration of a predetermined time period, occurrence of a predetermined event, the collected data reaching a predetermined amount of data points, or the collected values being above a threshold, below a threshold, within a range, or outside of a range.

FIG. 3 illustrates a method 300 for monitoring brake-fluid life. The method 300 includes calculating 302, via at least one controller, a boiling point for a brake fluid within a braking system of a vehicle; calculating 304, via at least one controller, fluidic properties for the brake fluid; calculating 306, via at least one controller, an amount of corrosion inhibitors within the brake fluid; calculating 308, via at least one controller, a reserve alkalinity of the brake fluid; and estimating 310, via at least one controller, a remaining effective life of the brake fluid using the boiling point, the fluidic properties, the amount of corrosion inhibitors, and the reserve alkalinity. Optionally, the method 300 may further include instructing 312, via an alert system of the vehicle, a user to replace the brake fluid in response to the remaining effective life falling below a predetermined threshold and/or adjusting 314, via a braking-control module, a response curve of the braking system such that a predetermined brake input, such as travel of the brake pedal, cylinder, plunger, or piston, provides a predetermined braking torque regardless of the effective life of the brake fluid.

The modules described herein may include a dedicated microcontroller or may share one or more microcontrollers with other modules.

While the best modes for carrying out the disclosure have been described in detail, those familiar with the art to which this disclosure relates will recognize various alternative designs and embodiments for practicing the disclosure within the scope of the appended claims.

What is claimed is:

1. A vehicle comprising:
   a braking system including a brake fluid therein and a brake pedal;
   at least one controller; and
   at least one memory storing instructions that, when executed by the at least one controller, are configured to:
   determine, via a boiling-point module, a boiling point of a brake fluid within a braking system of a vehicle;
   determine, via a fluidic-properties module, fluidic properties of the brake fluid;
   determine, via a corrosion-inhibitor module, an amount of corrosion inhibitors within the brake fluid;
   determine, via a reserve-alkalinity module, a reserve alkalinity of the brake fluid;
   estimate, via a brake-fluid life module, a remaining effective life of the brake fluid using the boiling point, the fluidic properties, the amount of corrosion inhibitors, and the reserve alkalinity; and adjust, via a braking-control module, a response curve of the braking system such that a travel of the brake pedal provides a braking torque at the remaining effective life that is substantially equal to the braking torque provided by the travel of the brake pedal at an initial life of the brake fluid.

2. The vehicle of claim 1, wherein the boiling point of the brake fluid is determined using an environment of the vehicle and a time in service of the brake fluid.

3. The vehicle of claim 1, wherein the fluidic properties of the brake fluid are determined using an environment of the vehicle, a time in service of the brake fluid, and a usage of the brake fluid within the braking system.

4. The vehicle of claim 1, wherein the amount of corrosion inhibitors within the brake fluid is determined using a time in service of the brake fluid.

5. The vehicle of claim 1, wherein the reserve alkalinity of the brake fluid is determined using a time in service of the braking fluid and a usage of the brake fluid within the braking system.

6. The vehicle of claim 5, wherein the instructions are further configured to determine, via a rotor temperature module, a temperature of each brake rotor exposed to the brake fluid, and the usage of the brake fluid includes use of the rotor temperature.

7. The vehicle of claim 1, further comprising a plurality of sensors configured to collect environmental data of an environment of the vehicle, wherein the environmental data includes an ambient temperature.

8. The vehicle of claim 7, wherein the environmental data includes a humidity.

9. The vehicle of claim 1, wherein the instructions are further configured to:
display, via a user interface, the remaining effective life; and
instruct, via an alert system of the vehicle, a user to replace the brake fluid in response to the remaining effective life falling below a predetermined threshold.

10. A method comprising:
determining, via at least one controller, a boiling point of a brake fluid within a braking system of a vehicle, wherein the braking system includes a brake pedal;
determining, via the at least one controller, fluidic properties of the brake fluid;
determining, via the at least one controller, an amount of corrosion inhibitors within the brake fluid;
determining, via the at least one controller, a reserve alkalinity of the brake fluid;
estimating, via the at least one controller, a remaining effective life of the brake fluid using the boiling point, the fluidic properties, the amount of corrosion inhibitors, and the reserve alkalinity;
adjusting, via a braking-control module, a response curve of the braking system such that a travel of the brake pedal provides a braking torque at the remaining effective life that is substantially equal to the braking torque provided by the travel of the brake pedal at an initial life of the brake fluid; and
instructing, via an alert system of the vehicle, a user to replace the brake fluid in response to the remaining effective life falling below a predetermined threshold.

11. The method of claim 10, wherein the boiling point of the brake fluid is determined using an environment of the vehicle and a time in service of the brake fluid.

12. The method of claim 10, wherein the fluidic properties of the brake fluid are determined using an environment of the vehicle, a time in service of the brake fluid, and a usage of the brake fluid within the braking system.

13. The method of claim 10, wherein the amount of corrosion inhibitors within the brake fluid is determined using a time in service of the brake fluid.

14. The method of claim 10, wherein the reserve alkalinity of the brake fluid is determined using a time in service of the braking fluid and a usage of the brake fluid within the braking system.

15. The method of claim 10, wherein the remaining effective life falling below the predetermined threshold is triggered in response to the reserve alkalinity falling below a predetermined level.

16. The method of claim 10, wherein the remaining effective life falling below the predetermined threshold is triggered in response to the amount of corrosion inhibitors falling below a predetermined level.

17. A method comprising:
determining, via at least one controller, a boiling point of a brake fluid within a braking system of a vehicle based on an environment of the vehicle and a time in service of the brake fluid, wherein the braking system includes a brake pedal;
determining, via the at least one controller, fluidic properties of the brake fluid based on the environment of the vehicle, the time in service of the brake fluid, and a usage of the brake fluid within the braking system;
determining, via the at least one controller, an amount of corrosion inhibitors within the brake fluid based on the time in service of the brake fluid;
determining, via the at least one controller, a reserve alkalinity of the brake fluid based on a time in service of the braking fluid and a usage of the brake fluid within the braking system;
estimating, via the at least one controller, an effective life of the brake fluid using the boiling point, the fluidic properties, the amount of corrosion inhibitors, and the reserve alkalinity; and
adjusting, via a braking-control module, a response curve of the braking system such that a travel of the brake pedal provides a braking torque at the effective life that is substantially equal to the braking torque provided by the travel of the brake pedal at an initial life of the brake fluid.

18. The method of claim 17, wherein the boiling point of the brake fluid is determined using an environment of the vehicle and a time in service of the brake fluid.

19. The method of claim 17, wherein the fluidic properties of the brake fluid are determined using an environment of the vehicle, a time in service of the brake fluid, and a usage of the brake fluid within the braking system.

20. The method of claim 17, wherein the amount of corrosion inhibitors within the brake fluid is determined using a time in service of the brake fluid, and the reserve alkalinity of the brake fluid is determined using a time in service of the braking fluid and a usage of the brake fluid within the braking system.

* * * * *